United States Patent Office 3,440,287
Patented Apr. 22, 1969

3,440,287
PROCESS FOR MAKING THIOETHERS
Lee H. Horsley, Midland, Mich., assignor to The Dow Chemical Company, Midland, Mich., a corporation of Delaware
No Drawing. Filed Nov. 24, 1965, Ser. No. 509,607
Int. Cl. C07c 149/10
U.S. Cl. 260—609                10 Claims

ABSTRACT OF THE DISCLOSURE

Mercaptans are oxyalkylated to produce 2-hydroxyalkyl thioethers substantially free of polyglycol thioethers by reacting the mercaptan with at least a 3-fold excess of alkylene oxide in the presence of a lithium or sodium mercaptide at a temperature of 80–125° C.

---

This invention relates to the production of β-hydroxyalkyl thioethers by the reaction of a vicinal alkylene oxide with a mercaptan. In this reaction as practiced heretofore, additional alkylene oxide reacted with the desired product, thus producing a polyoxyalkylene (i.e. polyglycol) thioether. Heretofore, attempts have been made to minimize this side-reaction by using less than the stoichiometric amount of alkylene oxide (i.e. by the use of excess mercaptan). In many cases this poses a separation problem because the mercaptan and the desired thioether often boil near the same temperature.

It has now been discovered that alkylene glycol monothioethers (β-hydroxyalkyl thioethers) are produced in high yield and conversion, and of high purity in that very little polyoxyalkylene thioether or unreacted mercaptan is present, by the reaction of a mercaptan with an alkylene oxide under carefully controlled conditions:

(1) The catalyst must be the sodium or lithium salt of the mercaptan to be etherified. Whereas the prior art has considered these catalysts to be merely the equivalent of the potassium, cesium, calcium, barium or amine salts, these latter catalysts are not equivalent to Na or Li salts in the present invention. If the catalyst is a Na salt, a small amount of water is usually essential for achieving the desired selectivity of reaction. At least about 3, and preferably 4–8 moles of water per mole of catalyst is used.

(2) The mole ratio of alkylene oxide to mercaptan should be at least three times, and preferably at least four times, the stoichiometric ratio.

(3) The reaction temperature should not exceed about 125° C. and is preferably not more than 100° C.

Operation outside the above critical limits leads to the formation of increasing amounts of polyoxyalkylene thioethers. It is to be understood, of course, that the above critical factors are interrelated and that good results can be obtained even when one variable is unfavorable, provided that the others are optimized. Thus, the Li salt is a more selective catalyst than the Na salt; the selectivities of the common lower alkylene oxides vary widely in the inverse order of molecular weight, i.e. $C_4 > C_3 > C_2$; the reaction is more selective at low temperatures than at higher ones and at high oxide/mercaptan ratios than at lower ones. By "selectivity" is meant the favoring of the desired reaction and minimizing of the undesired ones.

The catalyst can be added to the reactants as such or it can conveniently be made in situ by adding the alkali metal or its oxide, alkoxide or hydroxide, or the like, to the mercaptan or to the reaction mixture.

The amount of catalyst is not critical and can be varied widely. In general, large amounts, such as 0.1 mole per mole of mercaptan, cause rapid reaction but show somewhat less selectivity than do smaller amounts. Suitable ratios are about 0.01 to 0.1 mole per mole of mercaptan, the preferred ratio being about 0.02 to 0.06 mole per mole.

The practice of the invention is illustrated by the following examples.

In a series of experiments, the reactants were sealed in a glass ampoule, heated at 100–105° C. during the reaction period, cooled, removed from the ampoules and analyzed by vapor phase chromatography. In each experiment 0.01 mole of mercaptan and the indicated amount of $LiOH \cdot H_2O$ and alkylene oxide were reacted under a nitrogen atmosphere.

Results of some typical experiments are shown in the following table.

TABLE I

| Example | Mercaptan | Alkylene oxide [1] | Mole ratio Oxide to mercaptan | Mole ratio Catalyst to mercaptan | Temp. ° C. | Time, hr. | Mercaptan consumed, percent | Mole ratio, mono/poly [2] |
|---|---|---|---|---|---|---|---|---|
| 1 | Methyl | PO | 2 | 0.06 | 100 | 21 | 100 | 32 |
| 2 | do | PO | 4 | 0.06 | 100 | 21 | 100 | 52 |
| 3 | do | PO | 8 | 0.06 | 100 | 21 | 100 | 55 |
| 4 | n-Octyl | PO | 4 | 0.06 | 100 | 23.5 | 100 | 26 |
| 5 | do | PO | 6 | 0.06 | 100 | 23.5 | 100 | 46 |
| 6 | do | EO | 6 | 0.06 | 100 | 23.5 | 99.5 | .9 |
| 7 | Phenyl | PO | 4 | .04 | 100 | 19.5 | 100 | 88 |

[1] EO and PO represent ethylene and 1,2-propylene oxides respectively.
[2] Thioether of mono- and polyalkylene glycols, respectively.

EXAMPLE 8

When the experiment of Example 3 was repeated except that the catalyst was anhydrous $NaOCH_3$, the mole ratio of products was only 0.06. In contrast, when $$NaOCH_3 \cdot 4H_2O$$

was used, the product ratio was 25.

EXAMPLE 9

When the experiment of Example 5 was repeated except that the catalyst was anhydrous $NaOCH_3$, the mole ratio of products was only 0.09. When $NaOCH_3 \cdot 4H_2O$ was used, the product ratio was 19.5.

In a series of experiments an alkylene oxide was reacted with n-butyl mercaptan under various conditions and with the results as shown in Table II. In every example the mercaptan was completely consumed. Here again it was found that the Li catalyst was most selective (i.e. produced the highest ratio of monoglycol thioether to polyglycol thioether); that the presence of a small amount of water greatly improved the Na catalyst; and that the K catalyst was totally ineffective for making the monoglycol thioether.

TABLE II

| Example | Alkylene oxide [1] | Catalyst | Mole ratio Oxide to mercaptan | Mole ratio Catalyst to mercaptan | Temp., °C. | Time, hr. | Mole ratio mono/poly [1] |
|---|---|---|---|---|---|---|---|
| 10 | PO | LiOH·H₂O | 6 | 0.06 | 80 | 2 | ∞ |
| 11 | PO | NaOCH₃ | 6 | 0.06 | 80 | 2 | 10 |
| 12 | PO | NaOCH₃·6H₂O | 6 | 0.06 | 80 | 2 | ∞ |
| 13 | PO | KOH | 6 | 0.06 | 80 | 2 | 1 |
| 14 | EO | LiOH·H₂O | 8 | .08 | 90 | 0.5 | ∞ |
| 15 | EO | LiOH·H₂O | 8 | .08 | 90 | 6 | ∞ |
| 16 | EO | LiOH·H₂O | 8 | .08 | 90 | 21.5 | 100 |
| 17 | EO | NaOCH₃ | 8 | .08 | 90 | 1.0 | .6 |
| 18 | EO | NaOCH₃·6H₂O | 8 | .08 | 90 | .5 | 2.3 |
| 19 | EO | KOH | 8 | .08 | 90 | .5 | 0 |

[1] See footnotes to Table I.

Results similar to those shown above are obtained with other alkyl and aryl mercaptans, such as butyl, dodecyl, octadecyl, allyl, 2-metylallyl, oleyl, propargyl benzyl, cresyl, xylyl, napthyl, and the ar-halo and alkyl analogs of the foregoing and, in general, with any mercaptan susceptible of oxyalkylation by known methods. Similarly good results are obtained with other alkylene oxides, particularly butylene oxide.

I claim:

1. In a process for making a β-hydroxyalkyl thioether by the reaction of an alkylene oxide with a mercaptan, the improvement of effecting the reaction by contacting the oxide with the mercaptan in a molar ratio of at least 3:1, in the presence of a catalytic amount of the lithium or sodium salt of the mercaptan and at a temperature not exceeding 125° C.

2. The process of claim 1 wherein the catalyst is the sodium salt in combination with 3–8 moles of water per mole of salt.

3. The process of claim 1 wherein the alkylene oxide contains 2–4 carbon atoms.

4. The process of claim 1 wherein the catalyst is the lithium salt.

5. The process of claim 4 wherein the alkylene oxide is propylene oxide.

6. The process of claim 5 wherein the mercaptan is methyl mercaptan.

7. The process of claim 1 wherein the mercaptan is an alkyl mercaptan of 1–18 carbon atoms.

8. The process of claim 7 wherein the alkylene oxide contains 2–4 carbon atoms.

9. The process of claim 8 wherein the molar ratio of alkylene oxide to mercaptan is at least 4:.1.

10. The process of claim 9 wherein the reaction temperature is not more than 100° C.

References Cited

UNITED STATES PATENTS 3,030,426   4/1962   Moseley et al. ____ 260—609 XR

OTHER REFERENCES

Reid: Org. Chem. Bivalent Sul., vol. 1, pp. 127–128.

CHARLES B. PARKER, *Primary Examiner.*

D. R. PHILLIPS, *Assistant Examiner.*